United States Patent [19]
Park et al.

[11] 4,180,104
[45] Dec. 25, 1979

[54] OUT OF CONTACT HIGHLY GEOMETRICAL CRACK ARRESTOR

[75] Inventors: Donald M. Park, Calgary, Canada; Robert J. Eiber, Columbus, Ohio

[73] Assignee: Northern Border Pipeline Company, Kansas City, Mo.

[21] Appl. No.: 836,358

[22] Filed: Sep. 26, 1977

[51] Int. Cl.$^2$ ............................................. F16L 9/14
[52] U.S. Cl. ................................... 138/172; 138/153; 285/286
[58] Field of Search ................. 138/172, 153, 99, 103; 285/286

[56] References Cited

U.S. PATENT DOCUMENTS 3,202,184  8/1965  Godshalk ............................ 138/172

Primary Examiner—Steven L. Stephan
Attorney, Agent, or Firm—Kenyon & Kenyon

[57] ABSTRACT

A system for arresting cracks in a pressurized natural gas fluid pipeline comprising a plurality of bands encircling the pipeline each having a highly geometrical rim cross section and being out of contact with the pipeline along an arc of the inner circumference of the encircling band.

7 Claims, 7 Drawing Figures

U.S. Patent    Dec. 25, 1979    4,180,104
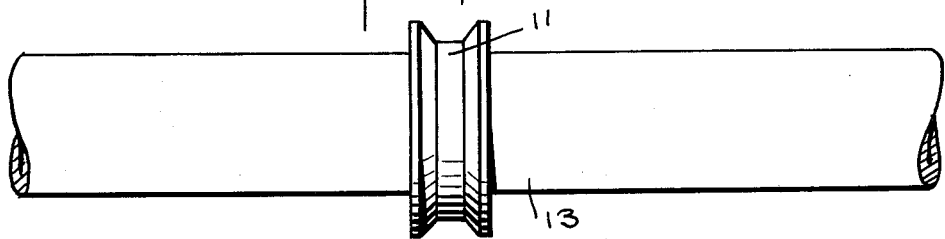
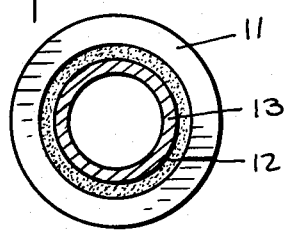
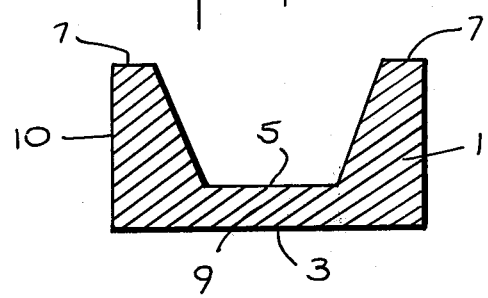
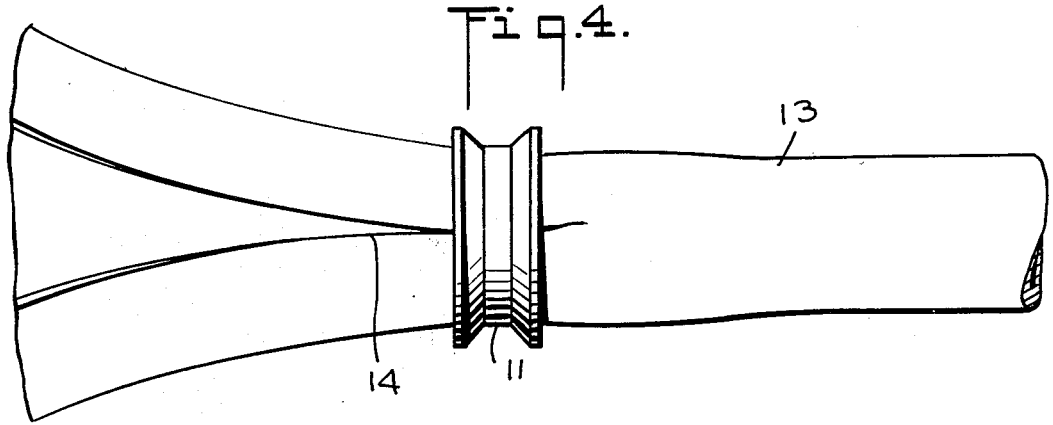
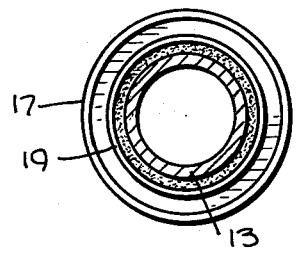
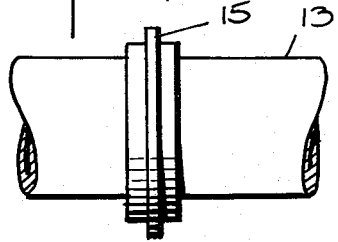
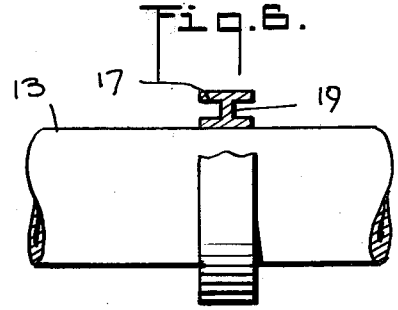

OUT OF CONTACT HIGHLY GEOMETRICAL CRACK ARRESTOR

BACKGROUND OF THE INVENTION

The present invention relates to a method and apparatus for limiting the propagation of ductile fractures in pipelines used to transport fluids such as natural gases, compressed gas liquids or liquid-natural gas mixtures under pressure (hereinafter "natural gas fluids"). More particularly, it relates to crack arrestors that may be put in place during fabrication of a pipeline or added to existing pipelines without degrading their quality. The system is particularly useful for long distance pipelines such as contemplated for the transport of natural gases and hydrocarbons from the Arctic.

It is known that it is very costly to fabricate and assemble highly crack resistant large diameter pipe suitable for use as pressurized natural gas transmission lines. In any event, it is not practical to design a pipeline that will under all conditions withstand the internal stresses or external shocks that may cause cracks in a pipeline. In addition, it is known that a crack of substantial size in such pipeline will rapidly enlarge such that its ends may propagate along the pipeline for extremely long distances. These propagating cracks are of two types: brittle and ductile. Brittle cracks propagate at high velocities, typically, 1,300–3,000 ft./sec. without much apparent deformation of the pipeline near the crack. The pipeline appears to break open and thereby relieve the stress causing the original crack. Ductile fractures propagate at lower velocities, typically, 250–1,000 ft./sec. and are associated with substantial pipeline deformation. Ductile fractures can propagate for substantial distances, up to several miles, ripping open the pipeline as if it was unzipped. Typically, ductile fractures run axially along the pipeline. Ductile fractures predominate above a critical temperature termed the brittle-ductile transition temperature, although, depending upon the means of fabrication, brittle fractures may be found at elevated temperatures.

There is a belief that the propagation of ductile fractures is made possible by the pressure of the natural gas in the pipeline against the flaps forming the edges of the crack. By that mechanism the crack may be driven forward at a velocity equal to the velocity of the low pressure front caused by the escaping gas. In this manner, although the gas pressure in the pipeline may rapidly drop as a result of gas escaping through the crack, there is sufficient pressure at the flap to cause the crack to propagate until it is arrested in some manner.

Many devices and methods have been discussed to arrest the propagation of ductile fractures. Some suggest attaching large masses to the pipeline to cause the fracture to deviate from its straight line path into a helical path in the hope that that will permit the low pressure front to catch up with the crack and result in an arrest. Another method that has been suggested in the copending application of R. Eiber, Ser. No. 665,547 and Loncaric U.S. Pat. No. 3,870,350 is to periodically interpose along the pipeline more brittle sections. This is believed to cause arrest at the end of the brittle section where the fracture again becomes ductile, due to the absence of the flap driving force. These latter arrestors would seem to have the disadvantage of artificially lowering the crack resistance of the pipeline: crack initiation becomes more probable although less destructive.

Crack arrestors have been suggested to interfere mechanically with the dynamic mechanism believed to sustain crack propagation. Thus, flexible sleeves or hoops which are an integral part of the pipe have been suggested to restrain flap formation. See "Bulletin" Research Laboratory, U.S. Steel Corporation, Apr. 10, 1974. Such flexible sleeves or hoops have been suggested to encircle the pipeline, in contact, and at zero or greater tension. Typically, it is suggested that such arrestors should be made of the same material as the pipeline. Crack arrestors have been suggested to interfere with the thinning of the pipeline in the region of the propagating crack tip. These arrestors have been designed to tightly restrain the circumference of the pipeline. See U.S. Pat. Nos. 2,401,092 (wire wound at high tension), 3,349,807 (steel strap or band at high tension), and 3,631,897 (tensioning strands).

Each of the above-mentioned crack arrestors suffers from the defect of requiring intimate contact as an integral part of the pipeline. See also Risley U.S. Pat. No. 3,096,105 (arrestor welded to pipe section). This defect is enhanced by the fact that the pipeline itself undergoes circumferential expansion as a result of the internal pressure of the transported gas. Thus, a balance must be maintained between the size of the arrestor and the pipeline's response to being pressurized. A sleeve type crack arrestor that is tight when the pipeline is brought up to operating pressure will introduce bending stresses into the pipe at the edge of the arrestor that could contribute to the formation of a crack in the pipe which is detrimental.

Plain sleeve type members have also been suggested in connection with laying deep underwater pipelines. See, e.g., Ells U.S. Pat. No. 3,860,039. There outside pressure on the pipeline predominates over internal pressures during the laying operation and the major problem is to restrain buckling associated with pipe collapse and not crack propagation. For that purpose it has also been suggested to weld reinforced sections into the pipeline.

SUMMARY OF THE INVENTION

According to this invention there is provided a pipeline crack arrestor system designed to restrain the tendency of ductile fracturing pipeline to develop an oval cross-section in advance of a propagating ductile crack tip.

Briefly, a crack arrestor full encirculement band is fabricated from a material of high tensile strength, which preferably is steel. Such steel should preferably be ductile fracturing under the conditions of use, although that is not essential. Alternatively, the arrestor may be made up of several sections that are assembled in place at the pipeline.

The arrestor preferably has a highly geometrical shape such as that of a formed channel with its sides orthogonal to the pipeline surface to impart rigidity against ovaling. These bands are applied sufficiently out of contact with the pipeline so as to provide a space between the arrestor and the pipeline at least along some arc of the inner circumference of the bands, and not to provide a condition of full contact at zero tension. One result of such application is that no secondary longitudinal discontinuity stresses are imposed at the edges of the band and the radial expansion of the pipeline is not restrained as the gas internal to the pipeline is brought up to its high pressure state. In the preferred embodiment, the average radial spacing between the arrestor and the pipe is on the order of 10 times the radial expansion that the pipe undergoes when being brought up to pressure. The length of the band longitudinally along the pipeline may be substantially shorter than with conventional crack arrestors, typical values being from ⅛ to ½ the diameter of the pipeline.

Accordingly, it is an object of this invention to provide a new and improved crack arrestor system for pressurized pipelines. It is a further object of this invention to provide an improved apparatus that will retard and restrain ductile propagating cracks in pressurized pipeline. It is a further object of this invention to provide an improved pipeline for the transport of natural gas compressed gas liquids or liquid-natural gas mixtures under pressure that will restrain the propagation of ductile fracures along its length.

Other aspects and advantages of this invention will be apparent from the disclosure and the appended claims.

BRIEF DESCRIPTION OF THE DRAWINGS

In the drawings, FIG. 1 represents a fragmented side view of a section of the preferred embodiment comprising a pipeline having a U-shaped formed channel in position.

FIG. 2 is a view of a cross-section of the same embodiment as FIG. 1 including a spacing material between the arrestor and the pipeline.

FIG. 3 is a view of the cross-section of the rim of the U-shaped preferred embodiment of the arrestor.

FIG. 4 is a side view of a pipeline after a propagating ductile crack has been arrested.

FIG. 5 is a fragmented side view of a section of a pipeline having a T-shaped ring in position.

FIG. 6 is a partially cut-away side view of a section of a pipeline having an I-beam-shaped ring in position.

FIG. 7 is a fragmented side view of a section of a pipeline having an I-beam-shaped formed channel in position.

DETAILED DESCRIPTION OF THE INVENTION

FIG. 1 of the drawing show a pipeline 13 formed from a plurality of pipe sections having in place thereon a U-shaped formed channel crack arrestor 11 spaced away from the pipeline along an arc. The arrestor is preferably formed from standard hot rolled U-channel stock rolled into a band and full penetration butt welded. The arrestor can be prefabricated and slipped over the end or a gap in the pipeline during assembly or repair. Alternatively the arrestor can be placed on an existing pipeline by splitting it into two halves and then welding these into a ring with full penetration butt welds.

The rim cross-section should have a highly angular shape (i.e., a so-called highly geometrical shape) and substantial bulk to inhibit deformation. For further clarity of expression, the term "non-convex polygonal rim cross-section" will be used to denote "rim cross-sections" whose boundary is substantially polygonal (i.e., made up of connected straight line segments with some smoothing of the corners) and non-convex (i.e., such that some points on the boundary cannot be connected by a straight line segment that lies entirely within the interior of the polygon). This definition may be found, for example, in 1 E. Hille, Analytic Function Theory, pp. 29-33 (Ginn & Co. 1959). An effective configuration for the rim cross-section is shown in FIG. 3 where the base 3 which faces the pipe is 1/6 of the pipeline diameter, the rim 7 has a width of 1/48 diameters, the notch 5 has a width of 1/10 diameters, the side wall 10 has a height of 1/12 diameters and the trough 9 has a thickness of 1/48 diameters.

A spacer material 12 may be inserted between the arrestor and the pipeline to prevent destruction of any protective coatings applied to the pipeline. The inner diameter of the arrestor should provide an average gap between the arrestor and the pipeline at least about 1½ times larger than the expansion of the pipeline due to pressure exerted by the contents of the pipeline. The average gap may be as large as 15 to 20 times the expansion.

When assembled along the pipeline a plurality of arrestors is employed. This not only assures that a crack meets an arrestor before it covers a large distance, but also permits closely spaced arrestors to cooperate by slowing a crack prior to arresting it subsequently. As will be explained below, the present invention has the unexpected feature of retarding the velocity of cracks before they reach an arrestor, and it is therefore possible for a more remote arrestor to have its cooperative effect and aid an earlier encountered arrestor to arrest a crack. This can permit a saving of material and weight as a multiplicity of lighter arrestors may replace a single larger conventional arrestor. It is possible to use the arrestors of the present invention in combination with other types of arrestors to form a mixed arrestor system.

FIG. 4 shows the observed manner in which the crack arrestor of the preferred embodiment arrests a propagating ductile fracture 14. It will be noted that the tip of the fracture may come to rest past the edge of the arrestor furthest from the direction of approach of the crack.

FIGS. 5, 6 and 7 show alternate embodiments of highly geometrical crack arrestor systems in which the individual arrestor has T and I configurations. In each, the members 15 and 19 rising from the part closest to the pipeline supply rigidity to the arrestor to restrain ovaling. It should be noted that unlike standard anchor flange reinforcements, the arrestors of FIG. 5 of present invention are not welded to the pipeline.

In operation, the arrestors according to the present invention do not degrade the pipeline or alter its operating characteristics. When a propagating ductile fracture approaches such an arrestor, the energy release into the ovaling mode is absorbed and as result the crack slows down. This slowing together with absorption of the incident energy from the fractural pipe causes the crack to arrest.

Experiments on a laboratory scale indicate that successful arrests of propagating ductile fractures can be accomplished with a loose-fitting formed channel having a length 1/6 of the pipe diameter and a yield strength 67% that of the pipe. The preferred range of yield strength is between about 50 and about 150% of the yield strength of the pipeline. The preferred range of tensile strength is ±50% of that of the pipeline. Although the channel is the preferred embodiment, other shapes such as I or T beams welded, cast or rolled into a loose-fitting rigid section are also proposed. The channel arrestor is preferably formed from material rolled into a circular ring having full penetration butt weld. As already mentioned, the arrestors may be placed on an existing pipeline by forming it into two or more sections and then welding these into a ring with full penetration butt welds.

It is believed that the invention will provide the advantage of inducing no secondary stresses in the pipeline. Because it is out of contact along an arc when no crack is present, spiral welded pipe may be used without the need to grind off the spiral weld seam in the vicinity of the arrestor to avoid intense localized secondary stresses. Furthermore, because it is out of contact, a liner to prevent damage to the protective coatings on the pipeline could be fitted in place at fabrication and all field coating could be eliminated. Also, since the geometry of the arrestor need not conform closely to the pipeline, its ends may be chamfered to facilitate dollys rolling over it.

To better understand the invention, it should be understood that the region just in advance of the propagating ductile crack tip although not yet cracked is subject to strains and deformation that cause substantial ovaling of the pipeline's initially circular cross-section. From the point of view of an observer seeing an advancing crack, ovaling occurs prior to the arrival of the crack tip. The other phenomena such as flap formation, although they may provide the dynamic means to maintain the crack's propagation, arrive at a position on the pipe only after the crack has passed. Thus, an arrestor designed to restrain ovaling commences to function before the crack has already passed through and therefore acts before the larger stresses and pressures at the flap are acting upon it. The action may be analogized to that of rock-jetties at the ocean which gently reflect and break up propagating waves before they reach the shoreline and thereby eliminate the need for strong walls to protect beaches from crashing ocean waves at full crest.

It is believed that an arrestor spaced from the pipe and formed in a highly geometrical configuration sufficiently arrests ovaling in high pressure gas pipelines to restrain crack propagation and in addition sufficiently slows such propagation to a point where it can be more easily restrained by other crack arrestors in close proximity further down the pipeline. One unexpected result observed during tests on a laboratory scale of full encirclement loose-fitting formed channel arrestors is that as a fracture approached such an arrestor, its speed was reduced substantially before the crack tip reached the arrestor. Thus, on an experiment where the steady state crack propagation speed was 690 ft./sec., the approaching crack was slowed to 515 ft./sec. prior to arriving at the arrestor that assisted to arrest the rack.

It is believed that the retarding effect on crack propagation permits the cooperation between a plurality of arrestors on the same pipeline whereby one slows down a propagating crack so that even if the arrestor then fails to bring about a complete arrest, the next arrestor in sequence may arrest completely. The arrestors should be within 2 pipeline diameters of each other.

Experimentation on reduced scale pipelines having 6 inch diameters indicates that when loose arrestors are employed not having a highly geometrical rim cross-section, such as loose-fitting sleeves as small as ¼ diameter long and having the same thickness and yield strength as the pipe, they undergo gross plastic deformation for their entire length. These sleeve-type arrestors therefore need to be manufactured from a ductile material to avoid fracturing during the arrest of a crack. In the present invention employing a formed channel or other geometrically shaped arrestor, the arrestor may, however, be fabricated from ductile or brittle cracking material. Also the present invention appears to arrest a crack in a different manner without the circumferential tearing of the pipe that occurs with the sleeve-type arrestors.

Therefore, in accordance with the invention, a crack arrestor comprises in its preferred embodiment a steel channel having a length approximately ⅛ to ½ of the diameter of the pipeline over which it is fitted so that the average radial spacing between the pipe and the arrestor is between 1½ and 20 times the expansion due to bringing the pipeline up to operating pressure.

What is claimed is:

1. A method for reducing the extent of propagation of ductile fractures in a pressurized fluid pipeline of a type that undergoes expansion when the pressure of the fluid is increased from atmospheric to operating pressures comprising
   (a) Forming one or more crack arresting bands having a non-convex polygonal rim cross-section and an approximately circular axial inner cross-section, and
   (b) placing one or more of said crack arresting bands at intervals along the pipeline so that each encircles the pipeline, wherein the spacing between the pipeline and the arrestor is 1½ to 20 times the expansion of the pipeline due to the pressure of the contents of the pipeline at operating pressure.

2. The method according to claim 1 wherein said rim cross-section comprises a U-channel cross-section.

3. The method according to claim 1 wherein said rim cross-section comprises an I-beam cross-section.

4. The method according to claim 1 wherein said rim cross-section comprises a T cross-section having the upper bar of the T closest to the pipeline.

5. The method according to claim 1 comprising the additional step of applying anti-corrosion coatings to the pipeline subsequent to assembling the crack-arresting bands in place.

6. The method according to claim 1 wherein a relatively soft insulating material is placed so as to prevent the crack-arresting bands from contacting the pipeline prior to the deformation of the pipeline associated with ductile crack propagation.

7. The method according to claim 1 wherein the step of placing at least one of said crack arresting bands along the pipeline is accomplished by forming said band into two or more sections and then forming these into a ring around said pipeline.

* * * * *